United States Patent [19]

Robichaud

[11] Patent Number: 5,702,786
[45] Date of Patent: Dec. 30, 1997

[54] PROCESS FOR PREPARING THERMOPLASTIC POLYOLEFIN RESIN ARTICLES OF REDUCED HYDROCARBON PERMEABILITY

[75] Inventor: Ronald T. Robichaud, Westerville, Ohio

[73] Assignee: Greif Bros. Corporation, Delaware, Ohio

[21] Appl. No.: 635,693

[22] Filed: Apr. 22, 1996

[51] Int. Cl.[6] ............................................. B29D 22/00
[52] U.S. Cl. .................. 428/35.7; 264/211; 264/540; 264/521; 264/327; 524/399
[58] Field of Search ..................... 264/540, 515, 264/211, 327, 521; 524/399; 428/35.7

[56] References Cited

U.S. PATENT DOCUMENTS 4,001,368  1/1977  Michizoe et al. .................. 264/176 R

FOREIGN PATENT DOCUMENTS 2244488  12/1991  United Kingdom.

Primary Examiner—Peter D. Mulchay
Attorney, Agent, or Firm—Kane, Dalsimer, Sullivan, Kurucz, Levy, Eisele and Richard

[57] ABSTRACT

A process is described for improving the hydrocarbon solvent impermeability of polyethylene resin based containers. The process employs a thermal profile during thermal molding, which creates a crystalline barrier adjacent one surface of the container. The barrier enhances impermeability of the container.

9 Claims, 8 Drawing Sheets

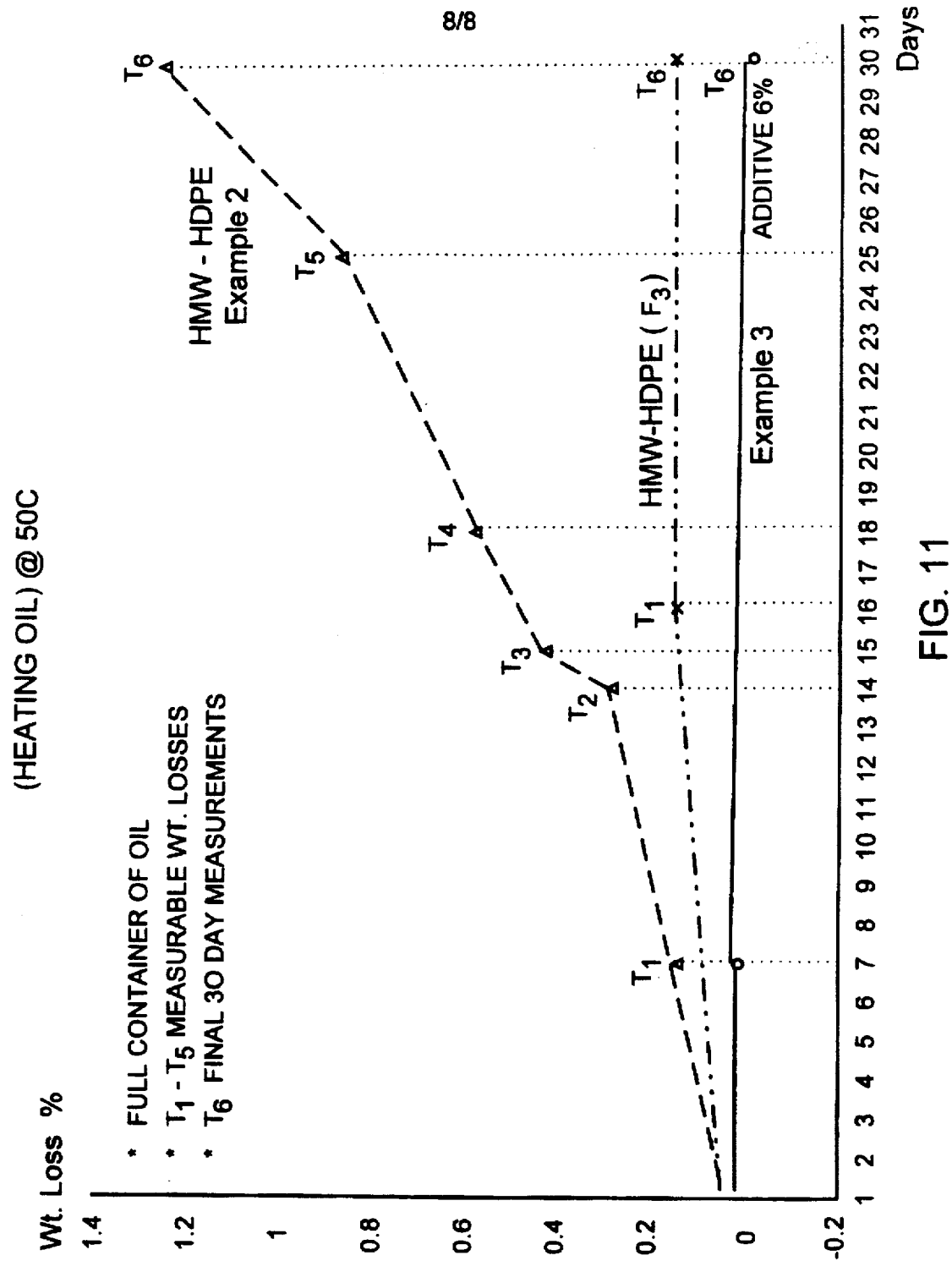

PROCESS FOR PREPARING THERMOPLASTIC POLYOLEFIN RESIN ARTICLES OF REDUCED HYDROCARBON PERMEABILITY

BACKGROUND OF THE INVENTION

1. Field of the Invention

The invention relates to methods and processes of fabricating thermoplastic polyolefin based articles.

2. Brief Description of Related Art

The use of resinous organic polymers to fabricate containers such as bottles, tanks and other molded articles is well known. Plastic containers which are made from most organic polymers, particularly the dominantly hydrocarbon polymers, are readily permeated and/or stress cracked or swollen by oleophilic materials such as liquid and gaseous hydrocarbons e.g., solvents, such as benzene, cyclohexane, xylene, chlorinated solvents and hexane; fuels such as gasoline, kerosene, fuel oils; oils such as natural fatty oils, lubricating oils, perfumes and agricultural chemicals. Depending on the particular plastic container, these oleophilic materials can adversely affect the container. For example, natural fatty oils tend to cause stress cracking of containers formed from olefinic polymers such as polyethylene.

As a result of these inherent deficiencies many containers must be treated with various agents which impart varying degrees of impermeability. Sulfonation techniques have been developed as one means of treating containers to decrease permeability and protect polymeric materials. Some of these sulfonation techniques are described for example in U.S. Pat. No. 4,775,587.

Surface modification of many plastics, whether of the rigid or flexible type, with fluorine or other halogens, has been found to be commercially advantageous in that it is capable of providing, for example, plastic containers having a reduced permeability insofar as liquids having solvent characteristics are concerned and having increased chemical resistance to various liquids and gases which would otherwise react with the untreated container material. One such process and the apparatus therefor is described in U.S. Pat. No. 4,467,075. the disadvantages of this and other treatment processes having surface modification as an objective are manifold. Some of the processes need complex apparatus because of the steps and conditions required by the process, which may entail moving fluorine from a holding chamber to a reaction chamber and back again, or the use of high pressures. Other processes pose a threat to safety. Reactive gases such as fluorine can be highly toxic, highly corrosive, and irritating. Any process that uses relatively high temperatures, pressures, and/or concentrations of fluorine fall into the hazardous category by increasing the possibility of fire or leakage. Finally, some processes create pollution factors because of the amount of fluorine and/or fluorine by-products, such as hydrogen fluoride, which have to be disposed of after the fluorination process is completed. The problems of apparatus, safety, and pollution are, of course, interrelated because in order to solve the latter problems of safety and pollution, the complexity of apparatus is usually increased and, concomitantly, investment and operating costs including energy requirements.

Another industry concern, of either sulfonation or fluorination, has been generated by the phenomenon of "frequency stimulation" and the effect upon sidewall stress cracking and therefore loss of permeation resistance in relation to polyolefin based containers.

Another approach to the improvement in or reduction of hydrocarbon solvent permeability in polyolefin containers has been to modify the polyolefin resin properties through blending with other resinous compositions. For example, the U.S. Pat. No. 4,410,482 describes a thermoplastic composition useful to fabricate container articles of reduced solvent permeability, which comprises polyethylene blended with an incompatible polymer such as a polyamide (nylon). The heterogeneous blend, upon molding, yields a laminar structure of reduced hydrocarbon permeability. In particular, such laminar articles derived from a polyolefin and nylon have been found to be useful as containers for liquid hydrocarbons, including fuel tanks for motor vehicles. Recent changes in gasoline technology have led to the addition of oxygenated compounds, such as methanol, to an ever increasing proportion of the hydrocarbon fuels now marketed. The loss of a fuel mixture of oxygenated compounds and hydrocarbons by diffusion through the walls of a container with a laminar structure of polyolefin and nylon has, in general, been found to be sufficiently great to be unacceptable from an environmental standpoint. In addition, as reported by parts processors and manufacturers, the polyethylene/nylon blends have presented some areas of concern; namely:

1. the amount needed of laminar polymer (e.g. nylon) for platelet formation.
2. Limited ability to re-use and recycle polyethylene/ nylon reground.
3. Loss of mechanical properties due to polymer immiscibility; specifically, in the "pinch off areas" of a molded container.

Polyethylene is a favored material used in fabricating the above-described containers. It is cheaply produced and readily molded or extruded. However, as observed above, polyethylene has serious drawbacks. When certain fluids such as hydrocarbon solvents are packaged in polyethylene containers, they have a tendency to migrate through the container wall. This is due to the solvent permeable nature of polyethylene.

One approach to reducing the solvent permeability of polyethylene resin based containers is described in my Australian Patent No. 645,121 issued on Aug. 29, 1991. This patent describes incorporating a minor proportion of a thermoplastic additive in the polyethylene. The additive is comprised of a polyethylene resin, polyvinylidine fluoride, and aluminum stearate as a tie agent, binding the polyvinylidine fluoride and the polyethylene thermoplastic. The blend can be thermoformed into a liner suitable for lining metal drums and containers of other materials, thereby serving as an extra measure of protection against permeation, or can be formed directly into container vessels.

Based on further work, we have now found that the additive described in my Australian Patent No. 645,121 has a particularly good effect on polyethylene, especially thermoformed high molecular weight-high density polyethylene (HMW-HDPE). It appears that upon cooling during the transition from the melt to the solid stage, the chain molecules of HMW-HDPE are able to arrange themselves through folding of the chains (layering) into crystalline regions. The extent of these regions (degree of crystallinity) is increased when the closer chains can approach one another (less degree of branching). Side chains interfere with parallel alignment. The crystalline regions, interspersed as sperulites throughout the amorphous material, increase the density beyond that for exclusively amorphous material. The density value is directly related to the degree of crystallinity.

Furthermore, we have observed that different HMW-HDPE with broadly similar molecular weight distribution (MWD) and melt flow indices (MFI), after crystallizing under constant cooling rates, possesses widely varying melting point. The different melting points were found to be correlative with different spherulite size; which,in turn, is controlled by the density of nucleating heterogeneities. This indicates that specimens with high nucleation density will crystallize, on average, at a higher temperature than those with a low nucleation density. This, in effect, controls the laminar thickness of the polyethylene crystals. We believe that with temperature control one can control laminar thickness of the polyethylene crystals and surface density and therefore the degree of resistance to hydrocarbon solvent permeation.

Depending on the polymerization process, polyethylene may have an inherent degree of crystallinity from 40 to 80%. Low density polyethylene sometimes referred to as flexible polyethylene, has 40-55% crystallinity at a density of 0.915 to 0.930. High density polyethylene has a crystallinity figure of 60-80% at a density of 0.942-0.965.

The properties of polyethylene depend on the degree of crystallinity of the material. With increasing density (crystallinity) an increase occurs also in the following properties:

1. Crystalline melting range
2. Yield stress (tensile strength), stiffness
3. Hardness and modulus of elasticity and/or torsional stiffness.
4. Resistance to solvents
5. Impermeability to gases and vapors The effect of crystallinity on physical properties can be observed as follows:

| PROPERTY | AS CRYSTALLINITY INCREASES |
|---|---|
| Density | Increases |
| Strength | Increases |
| Stiffness | Increases |
| Hardness | Increases |
| Wear/Abrasion | Increases |
| Ultimate Elong | Decreases |
| Impact | Decreases |
| Clarity | Decreases |

We have also observed the effect of processing variables on crystallinity. In general, higher melt temperatures result in slower cooling rates, which increase crystallinity. Quick quenching results in minimum crystalline development while slow quenching results in maximum crystallinity.

We have also determined that in the additive of my Australian patent described above, polyvinylidene fluoride (PVDF) resin crystallizes in at least three (3) crystalline forms designated alpha, beta, and gamma. Normally, PVDF crystallizes from the melt predominately in the alpha form. The degree of crystallinity and the type of crystalline forms present depend upon the processing conditions. Rapid cooling (quenching) of the melt impedes crystallization and promotes a smaller crystalline size. Slow cooling or heating below the melting point (annealing) perfects the crystallization process and relaxes stresses. In addition, orientation below the melting point will enhance crystallization.

The additive of my Australian patent is a non-laminar product made from a blend of two (2) miscible materials (HMW-HDPE and PVDF) and one (1) polymer compatibilizer (aluminum stearate) which serves to increase the miscibility of the HMW-HDPE and PVDF materials. The successful use of the additive depends on establishing a melted homogeneous blend of compatible and miscible polymers.

We have now discovered that if polyethylene is melted and extruded under certain conditions to optimize crystal formation, in the presence of the additive of my Australian patent described above, further improvements in resistance to hydrocarbon solvent permeability is obtained.

SUMMARY OF THE INVENTION

The invention comprises a process for preparing polyethylene resin articles of reduced hydrocarbon permeability, which comprises;

providing a thermoplastic resin composition, which comprises;

a major proportion of a polyethylene resin;

a minor proportion of polyvinylidene fluoride; and a binding proportion of aluminum stearate;

feeding the resin composition to a heating zone, said zone being maintained at a temperature above the first order phase transition temperature of the polyethylene, whereby said fed composition is thermally plasticized;

continuously passing the plasticized composition to a shaping zone wherein said plasticized composition is shaped in the form of an article having first and second surfaces;

cooling the article first surface to a temperature between the first and the second order phase transition temperatures of the polyethylene, while maintaining the second surface at a temperature above the first order phase transition temperature for a period of time sufficient to form sperulites of crystals at the first surface; and then cooling the whole of the article to room temperature.

The term "major proportion" as used herein means more than 50 percent by weight of the total composition as opposed to a "minor proportion" which means less than 50 percent by weight. a "binding proportion" means about 50 to 100 gms per 100 weight of the polyethylene and PVDF mixed.

BRIEF DESCRIPTION OF THE DRAWINGS

FIG. 11 is a graphical representation of the test results obtained in Example 5.

DETAILED DESCRIPTION OF THE PREFERRED EMBODIMENTS OF THE INVENTION

Apparatus and method are well known for extruding mono- or multi-layered thermoplastic tubes; see for example U.S. Pat. Nos. 4,798,526; 3,949,042; 4,578,025; 4,657,497; 4,773,954; 4,798,526; and 5,019,433. The apparatus may, in its simplest form, be used for molding single layer articles. The apparatus may also be used as part of a blow-molding apparatus, providing the parison for blow-molding of containers and the like. Such apparatus may comprise a die head of modular construction wherein each module die block receives a thermoplastic polymer stream and forms a uniform tubular layer of a parison. These layers may be combined in any number to form monolayer or multilayer parisons with each layer of multilayer parisons being added uniformly to the outer surface of previous layer(s). The internal resin flowpath geometry of each module is such that extruded resin material is introduced into the module and the material flows along a path towards an annular orifice and then along a mandrel. To insure that the material flows efficiently from the point of entrance to the annular orifice, a pathway between the resin entrance and annular orifice is structured to conform to the flow tendencies of the resin stream, avoiding back eddies and stagnation zones, thus causing the resin material to emerge from the annular orifice in a uniform manner and virtually without a knit or weld line. The channel dimension (height or width) may be varied over a wide range and will be selected for each module relative to another module depending on the relative viscosity of the resins and throughput rate selected. The higher viscosity resin should be passed through channels of larger dimension than the lower viscosity resin at equal throughput rates.

In preferred apparatus each module is coupled to the adjacent module in such a manner that a thermal break exists between them. This thermal break allows for greater control of the temperature conditions employed for each melt channel of each module. In addition, the modules and mandrel sections have their own temperature control systems, thus, allowing for temperature zoning and variation according to the need of each resin layer on the inner and outer surfaces thereof.

Figure 1:
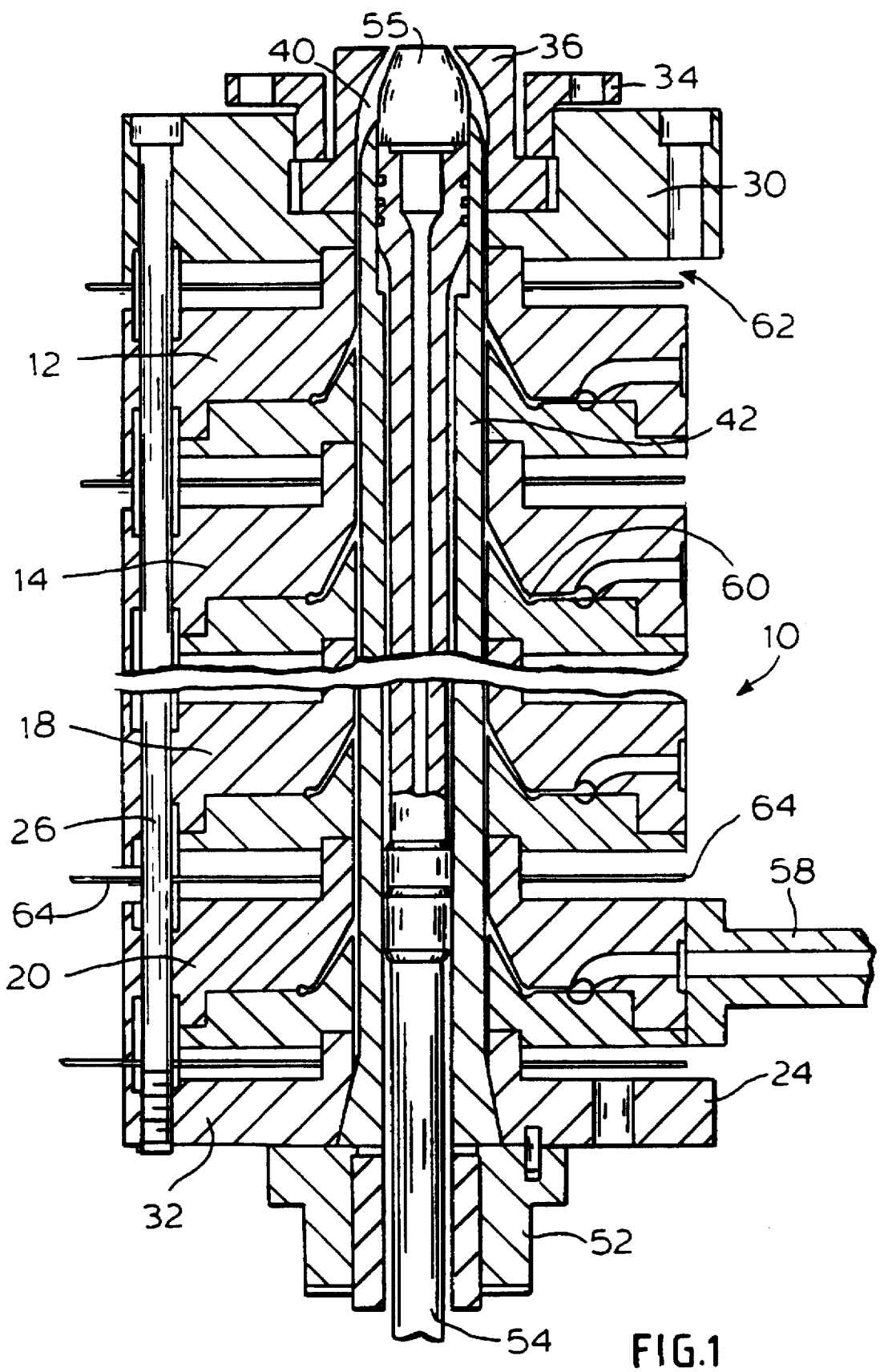
FIG. 1 is a fragmented cross-sectional side view of an assembled embodiment molding apparatus useful in the process of the invention.

Referring first to FIG. 1, a fragmented cross-sectional side view of an assembled apparatus 10 is shown. The apparatus 10 comprises a plurality of die block modules 12, 14, 16, 18, 20 arranged in a vertical stack to form a die body 24 for the apparatus 10. The module 16, positioned between modules 14 and 18, is not seen in the fragmented view of FIG. 1 for clarity of the drawing but is essentially identical to the illustrated modules. The modules 12, 14, 16, 18, 20 comprise individual die blocks made up of an upper die plate and a lower die plate. The upper and the lower die plates nest together and are held together in the assembly of die block 24, as are the assembled modules, by a plurality of tie bolts such as bolt 26, around the periphery of apparatus 10. The modules are maintained in the vertical stack by the tie bolts which hold together the terminal head plates 30, 32 with interposed modules under sufficient compression to avoid leaks of thermoplastic melt material from between the upper and lower die plates and from between the modules. Above the terminal head plate 30 is an attached die holder 34 and annular die 36 for extrusion of a thermoplastic parison as will be described more fully hereinafter.

Figure 2:
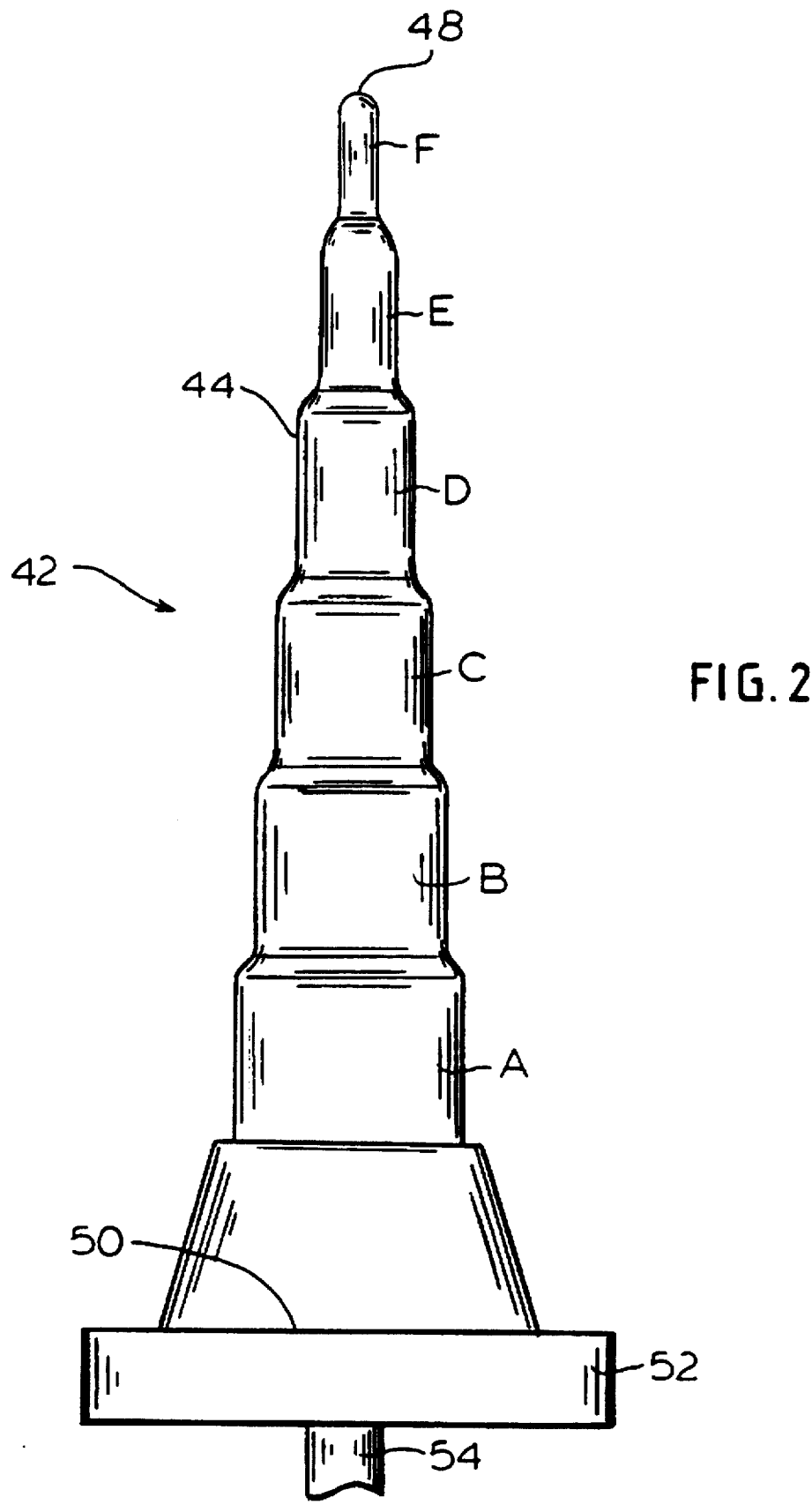
FIG. 2 is a view of the mandrel component of the apparatus shown in FIG. 1.

Secured and removably fixed within a central cylindrical bore or extrusion channel 40 by anchor bolts attached to the terminal head plate 32 is a tapered, cylindrical mandrel 42. FIG. 2 is a side view of the mandrel 42, removed from channel 40 for viewing. The mandrel 42 comprises a tapered 10 (in steps) mandrel body 44 having a first end 48 and a second end 50. A flange 52 about the periphery of the body 44 at end 50 provides a means of fixing the mandrel 42 in place within the extrusion channel 40 with the anchor bolts. The mandrel body 42 has a concentric central cylindrical bore and is a hollow tube, the exterior tapering from end 50 to end 48 in a number of steps designated by the letters A–F. The number and width of the steps corresponds to the number and width of the separate extrusion channel 40 segments formed by each of modules 12, 14, 16, 18, 20 as discussed more fully hereinafter. The mandrel body 42 is open at ends 48, 50 to receive in the hollow thereof a movable programming die stem 54. The die stem 54 movement within the hollow of mandrel body 44 may be controlled by an electronic parison controller, for example a commercially available programmer available from Graham Engineering Co., Inc., York, Pa. The controller, not shown in FIG. 1–2 may be mounted on the flange 52 for connection to the die stem 54. The die stem 54 carries a fluid (gas) for flow through the core of the parison to be extruded and expanded in a following blow-molding operation, the fluid under pressure acting to maintain the parison shape prior to blowing of the container article to be thermoformed.

Figure 3:
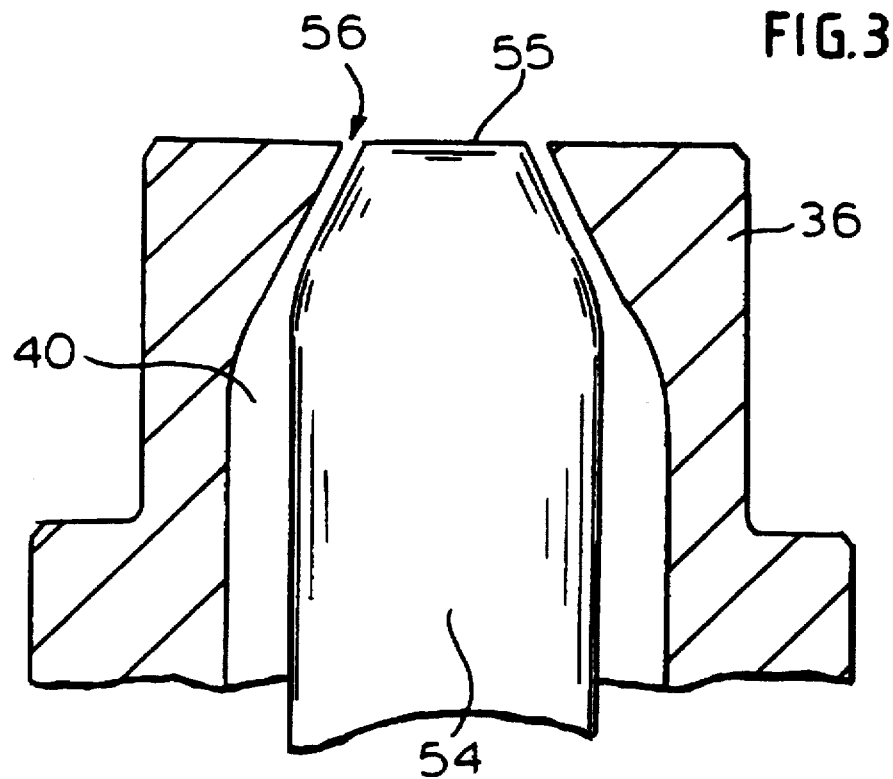
FIGS. 3 and 4 are cross-sectional side elevations of the assembled die component of the apparatus of FIG. 1.
Figure 4:
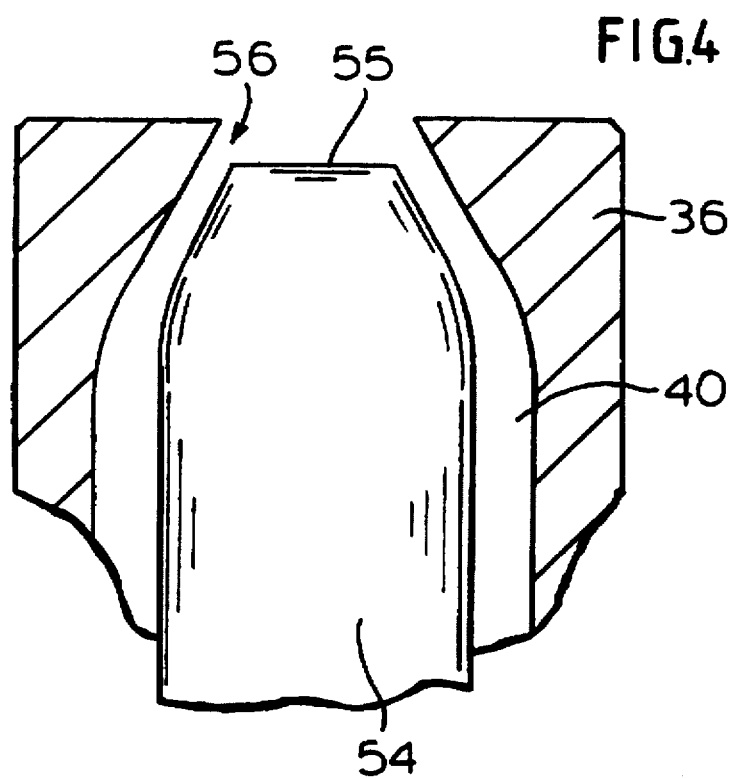

FIG. 3 is a cross-sectional side elevation of the extrusion die 36 component of the apparatus 10 shown in FIG. 1, and shows that the lower extension of the die stem 54 is a pin 55 which is movable to expand or contract the extrusion channel 40 at the die 36 orifice 56, thereby accommodating control of the parison wall thickness. The pin 55 moves in or out of the die 36 orifice 56 as the connected die stem 54 is similarly moved within the hollow core of mandrel 42. As shown in FIG. 4, the pin 55 has been retracted to increase the parison wall thickness. During operation, the parison wall may be continually varied in thickness. For example the thickness of the parison portion may be greatest for blown container walls which have the highest blow ratios, so that when the parison is blow molded the resultant container article may have a uniform wall thickness. Thus, the maximum diameter portion of the container formed will be blow molded from a thicker part of the parison wall portion.

The apparatus 10 may be employed as the parison extruding component of a conventional blow-molding apparatus, receiving thermoplastic resin melt from a melt source such as one or more thermoplastic extruders and discharging a formed mono- or multilayer parison from the die 36 into a mold. The thermoplastic melt from each extruder is received separately in an extrusion channel formed by assembly of the individual modules comprising the die body 24, through a thermoplastic melt feed pipe. There is preferably an individual feed pipe communicating between each module and the melt source or sources (extruder) so that each die block module is individually served with resin melt. In the FIG. 1, only one of a plurality of feed pipes 58 is shown for clarity of the illustration, as a conduit between the resin melt source and a fixed, constant volume distribution channel 60 formed by the assembly of module 20. The resin may be flowed to each module assembly from a constant volume displacement pump. The pump speed is controlled to supply resin melt to the module assembly at a desired pressure. Each module 12, 14, 16, 18, 20 contains within it a constant volume distribution channel 60 and a terminus of a resin melt feedpipe such as feedpipe 58 connected to the distribution channel 60 for delivery of resin ultimately to the extrusion channel 40.

The annular recesses 62 are air slots and serve as thermal breaks between the assembled modules of die body 24 and the terminal head plates 30, 32. These thermal breaks are open to the atmosphere at the outer periphery of the modules to facilitate the transfer of heat from the recess and the modules. Similar thermal breaks 62 are also located between the modules as illustrated by FIG. 1. Isolation of the modules 12, 14, 16, 18, 20 from each other by thermal air breaks 62 provides apparatus wherein greater temperature control over the thermoplastic melt flowing within each individual module may be achieved. Further thermal isolation of the modules may be achieved by incorporation of thermal insulation discs 64 between the modules, suspended in the recesses 62. Isolation of the modules by insulation discs 64 prevents the radiational and convection transfer of thermal energy between modules, which might otherwise result in undesirable temperature conditions in adjacent modules. Any known thermal insulating material may be used as the insulating disc 64 such as fiberglass, asbestos and like materials in a self-supporting (rigid or semi-rigid) form. The insulating disc 64 should not fill the recess 62 since the air break is necessary. A filling placement of insulating material, such as fiberglass, within the annular recess 62 between the modules would not effectively zone the modules and could result in a degradation of any high temperature sensitive resins within a module adjacent to a module operating at a temperature degradative of the sensitive resin. The separation and thermal isolation of each module member making up the die body 24, with air gaps and insulative material discs 64 allows for the efficient removal of excess heat from within each module and close control of the separate and individual resin melt temperature at the point of extrusion into the extrusion channel 40. The thermal break avoids radiational heating of adjacent layers to help maintain the temperature differential between adjacent layers, as much as 150° C. This is obviously very important when adjacent resin layer materials require vastly different melt temperatures. Preferably, there is minimal surface contact area between the modules to avoid thermal transmission between modules. This feature of the apparatus is advantageous when adjacent layers of a multi-layered parison being extruded require substantially different temperature conditions for melt extrusion; particularly when one of the resins requires a temperature which would cause degradation of the adjacent resin being expressed into the extrusion channel 40 and onto the mandrel 42. With inefficient temperature control, the extruded multi-layered parison product may be degraded to the point of reduced utility.

Critical to the process of the present invention is control of the temperature of mandrel 42. In order to create a thermal profile across the thickness of the individual parison layers which will facilitate crystallization along one surface of the polyethylene layer being incorporated in the parison (or monolayer of the resin), the mandrel 42 is maintained at a temperature above the first order phase transition temperature of the polyethylene resin layer for a longer period than the temperature of the associated module 12, 14, 16, 18 or 20. The mandrel 42 was previously described as a hollow body, and within the hollow thereof there can be mounted a plurality of resistance heaters and temperature sensors for their control, one for each of the steps designated by the letters A–F (see FIG. 2). These controlled means for heating create separate heating zones for each of the mandrel 42 steps A–F for maintaining the individual parison inner layer or layers (or monolayer) surfaces at a temperature above the first order phase transition temperature while the other surface(s) of the parison layers or monolayer are cooled to a temperature below the first order phase transition temperature. As the temperature of the associated module 12, 14, 16, 18 or 20 is reduced below the first order phase transition temperature of the polyethylene composition, a solvent impermeable zone is formed by the slower crystallization of the polyethylene layer at the surface adjacent to mandrel 42.

Figure 5:
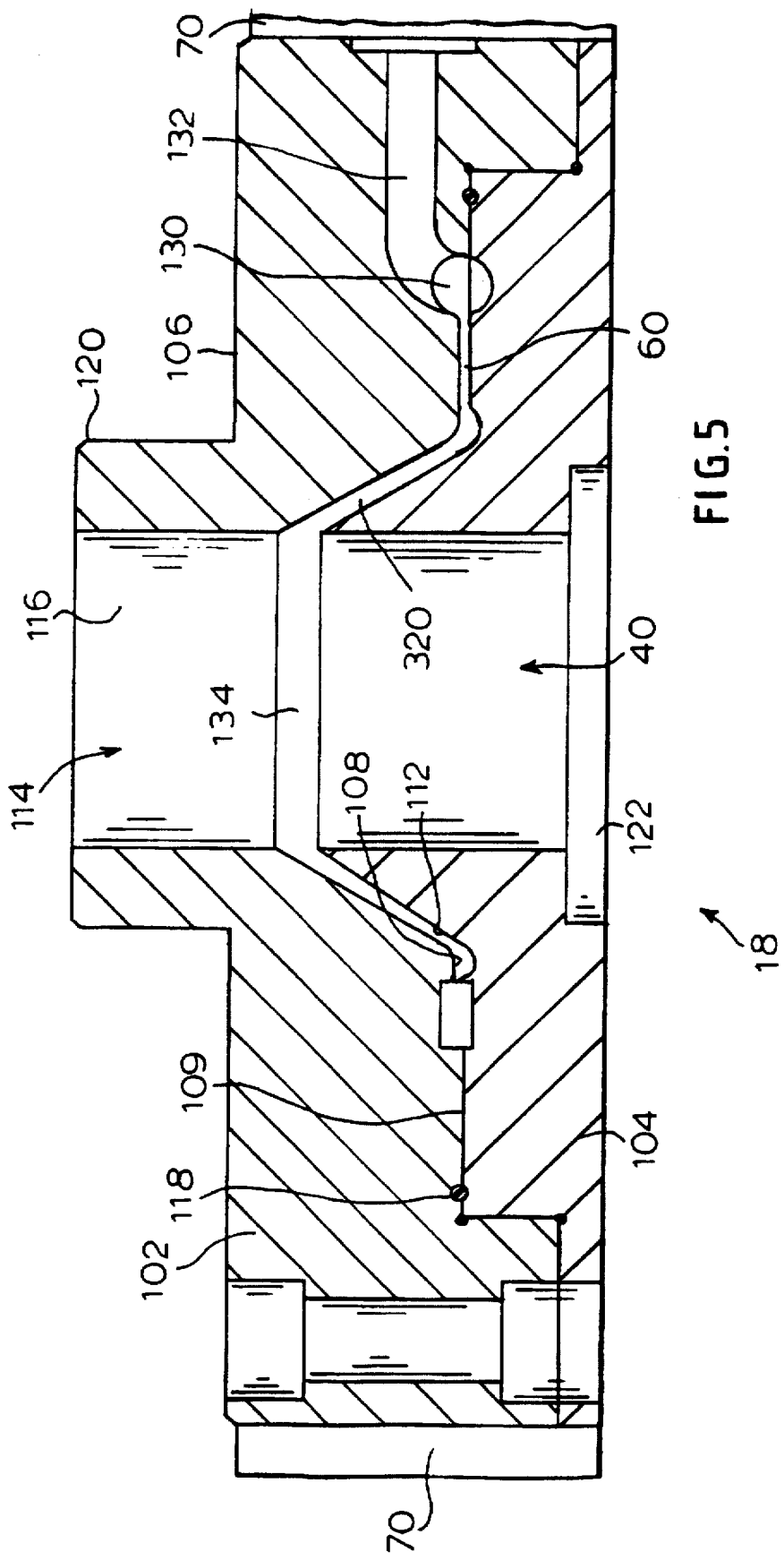
FIG. 5 is a cross-sectional side elevation of a module component of the assembly shown in FIG. 1, along lines 5—5 of FIG. 9.
Figure 6:
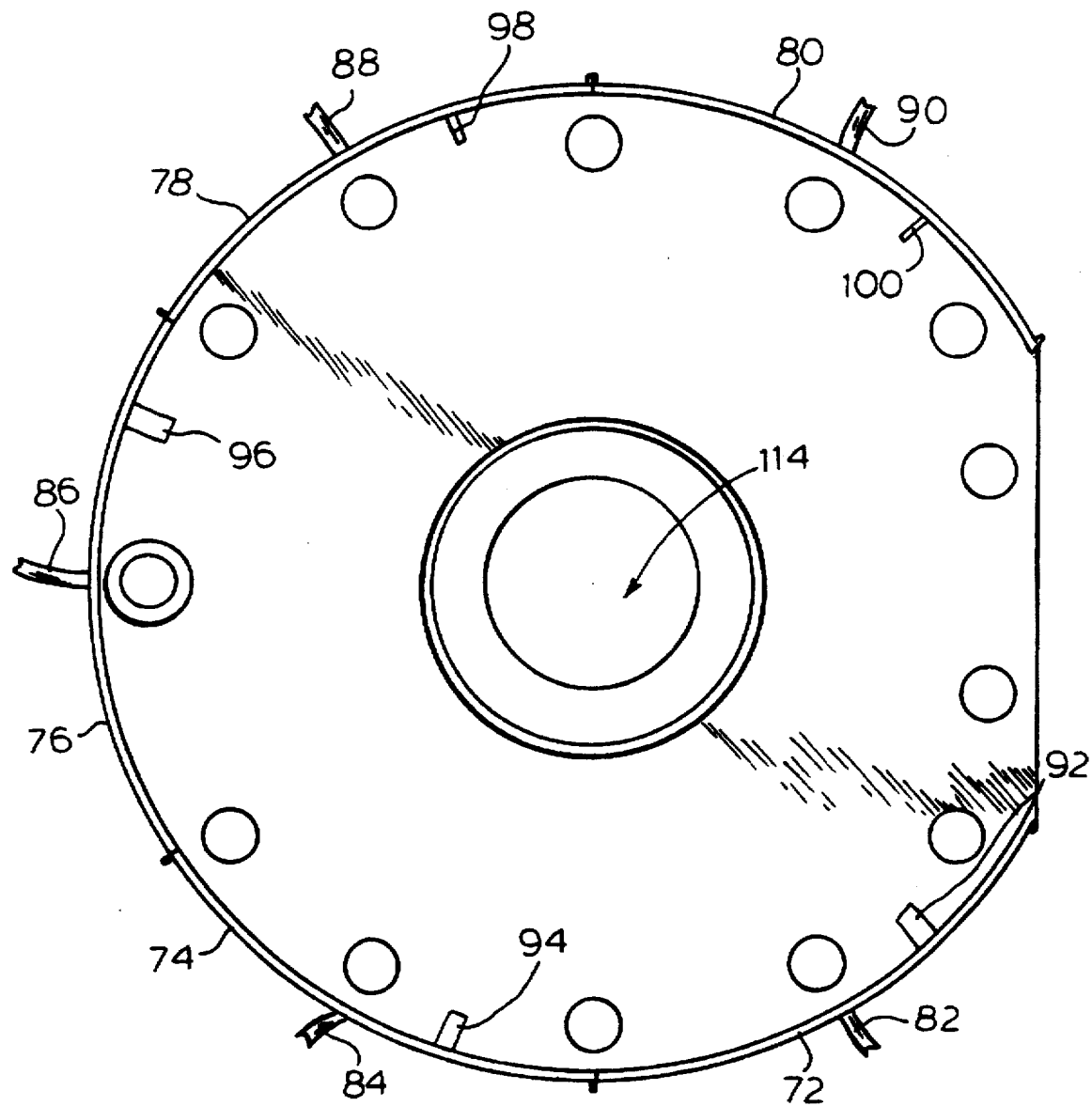
FIG. 6 is a view-from-above of the module seen in FIG. 5.

Each module 12, 14, 16, 18, 20 is associated with individual means for heating the module to a temperature advantageous to the extrusion of a given resin layer. FIG. 5 is a cross-sectional side elevation of the module 18 shown removed from the die block 24 assembly and fitted on the exterior with a resistance heater 70. The resistance heater 70 is fitted in close contact with the outer peripheral wall of the annularly shaped module 18 so as to transfer thermal energy to the module 18 by radiation and/or conduction. The heating means of resistance heater 70 may be divided into a plurality of separate heaters mounted on the module exterior so as to substantially encircle the module. The FIG. 6 is a view-from-above of the module 18, bearing such a heating means comprising a plurality of five resistance zone heaters 72, 74, 76, 77 and 80 together with separate electrical supply means 82, 84, 86, 88 or 90 for energizing the heater associated therewith. The heaters individually zone heat the separate portions of the steel modules to the proper steel temperature for the different resins flowing through the individual modules. The correct balance of thermal energy input from the heaters and thermal energy dissipation from the open annular slots or recesses 62 further assure temperature control of each module so that resins with very different flow temperatures may be extruded through adjacent modules and onto the mandrel without degradation. The zone heater elements of the modules such as resistance heater elements 72–90 may be and preferably are individually energized and de-energized to maintain a predetermined melt temperature in zones of the resin melt distribution channel 60. Thermocouples such as thermocouples 92, 94, 96, 98 and 100 may be associated with each of the module zone heating elements as part of a conventional energizing and de-energizing electrical circuit to aid in the desired steel temperature control.

FIG. 5 is a cross-sectional elevation of the die block module 18. The modules 12, 14, 16 and 20 as represented by module 18 are made up of an upper die plate 102 and a lower die plate 104. The upper and lower plates 102, 104 each possess a generally planar body. The die plate 102 has an outer surface 106, an inner surface 108 and a central aperture 114 through the module communicating between surfaces 106 and 108. The aperture 114 is bordered by the sidewall 116 formed by the module body. Similarly, the lower die plate 104 has an outer surface 110 and an inner surface 112 with a central aperture 114 communicating between surfaces 110, 112 and defined by a sidewall 116 of the module body. The central aperture 114 of each module die plate 102, 104 is in fixed axial alignment with the central aperture of each other module die plate of each module in the vertically stacked assembly of the die body 24, to form a continuous open extrusion channel 40 of substantially uniform diameter. Each module die plate such as 102, 104 is positioned as one of an upper and a lower member in a pair within the vertical stack. Each module 12, 14, 16, 18, 20 inner surface between paired module die plates 102, 104 such as surfaces 108 and 112 bears an annular seal 118 in a seal groove which functions to prevent any leakage from the channel 60. The adjacent surfaces 108, 112 of the upper die plate 102 and the lower die plate 104 of each pair meet at parting line 109 and together form an annular, distribution channel 60. The upper surface 106 of upper die plate 102 bears an upward projecting flange 120 about the central aperture 114. The flange 120 is of a size and configuration to mate with a recess in the lower die plate of the adjacent module 16. The recess in the lower die plate of the adjacent module 16 is identical to the recess 122 shown in the lower die plate 104 of module 18, which receives the flange 120 of the next adjacent upper die plate of the lower module 20. Through the interconnection of the individual flanges 120 of each module with the recesses 122 of each module, the modules 12, 14, 16, 18 and 20 nest together in the stacked assembly of die block body 24 to assure axial alignment of each aperture 114 to form the extrusion channel 40 having a uniform diameter throughout the die block 24. Thus, the modules interlock to form the die head assembly and define the aligned cylindrical mandrel receiving bore. The physical structure of the modules and their method of assembly permits thermal zoning of the parison layers to be extruded and alignment of the module apertures 114 to form a smooth, axially aligned extrusion channel 40.

Each distribution channel 60 formed by the assembled module upper and lower die plates 102, 104 within the die head 24 is radially disposed about the extrusion channel 40 with a resin melt inlet 130 at the termination of a feed conduit 132 and an annular melt outlet orifice 134 on the inner periphery of channel 60 through sidewall 116. The, melt orifice 134 opens into the extrusion channel 40. The channel 60 of the preferred apparatus 10 is a fixed, predetermined volume, free of contained moving or separate immobile structures.

In operation, the apparatus described above functions to fabricate a mono- or multilayered tube shaped (round or oval) parison, the number of assembled and functioning modules determining the number of layers in the product parison. Thus, the apparatus may be employed to produce a mono- or a multiple layered parison with a wide range of thermoplastic resin materials, including all extrudable resin materials. Examples of such resins include cellulose esters and ethers such as ethyl cellulose acetate, acetobutyrate, and acetopropionate; vinyl and vinylidene polymers and copolymers such as polymers and copolymers of vinyl chloride, vinyl acetate, vinylidene chloride, polyvinyl alcohol, polyvinyl butyryl; and polymers and copolymers of olefins, such as ethylene, propylene, and butylene; polymers and copolymers of styrene, 2-methyl styrene and their mixtures of elastomeric copolymers; polyamides, interpolyamides such as polyhexamethylene adipamide, polycaprolactam, polyundecanamide, polyhexamethylenesebacamide; polycarbonates; polyaldehydes, polyethers; polyurethanes; polyesters; natural and synthetic elastomers; thermoplastic fluorinated resins; silicon resins and elastomers and the like.

These thermoplastic resin materials can, of course, be used in admixture with fillers, plasticizers, colorants, or other ordinary additives, provided they do not prevent melt extrusion.

In the preferred process of the invention, various thermoplastic materials such as those described above are combined to take advantage of the desirable properties of each thermoplastic, one of which is the polyethylene resin modified with the additive of my Australian patent described above, to reduce hydrocarbon solvent permeability. By way of example of desirable properties, there may be mentioned mechanical strength, resistance to shock, thermal properties, transparency, opacity, resistance to chemicals, impermeability to liquids, gases, and odors, ease of working ability to receive printing or decoration, etc.

It is also contemplated in the present invention that a multiple layered parison of the thermoplastic resins may be made having layers of adhesive between each layer of thermoplastic. For example, a multilayered parison may be made having mutually compatible adhesive resin interposed between adjoining layers of thermoplastic resin which, without the interposed adhesive, would not normally adhere to each other. In this way it is possible to form multiple layer products combining materials for their specific properties, irrespective of whether these materials are capable of being directly bonded to one another during coextrusion.

As shown in FIGS. 1-7 the mandrel 42 is fixedly positioned within the extrusion channel 40 in a spaced apart relationship with the sidewall 116 to define a continuous, vertical, annular or cylindrical extrusion channel 40 closed at the top by the terminal head plate 30, open at the bottom through the extrusion die 36 and communicating with each module orifice 134. Thermoplastic melt under pressure enters the extrusion channel 40 from annular orifice 134 to be received on the stepped mandrel 42. One advantage of the apparatus described above is found in its ability to operate at relatively low resin pressures, i.e., 5000 psi or less. This advantage results in part from the mandrel 42 design and positioning described herein which can provide a parison free of knit lines, even at relatively low pressures. Each distribution channel 60 discharges the melt to the extrusion channel 40 and onto the tapering, stepped mandrel 42 so as to obtain an optimum desired parison layer thickness of each thermoplastic discharge in a sequential, step-wise manner, i.e.; the first or lowermost module provides melt for the innermost layer of the parison. The stepped taper of the mandrel 42 and a uniform cylindrical diameter in the extrusion channel 40 give uniform laminar, constant speed flow rates in the individual layers during extrusion. Progressively, each higher module through the associated orifice 134 introduces its melt flow into the broadening passageway of channel 40 created by the mandrel 42 steps until the last or uppermost module orifice 134 introduces the outermost layer of the formed parison before its passage to the extrusion die 36. Advantageously the thickness of each parison layer is controlled to be in the range of from 1 to 100 mils. The thickness of the parison and individual parison layers is controlled also by the use of the stepped mandrel 42, which functions to maintain a uniform resin pressure throughout the length of the extrusion channel 40. Thickness may also be controlled by adjusting the flow rates of individual resin layers, higher flow rates making for thicker layers. As the resin melt is delivered from the annular orifice 134 of each assembled module, the resin flows onto the surface of the stepped mandrel 42 at a step adjacent to the particular orifice 134. The resin flows emanating from the plurality of orifices 134 may be at different pressures. Pressure equilibration occurs as the separate flows join on the mandrel 42. By varying the pressures of the separate resin flows the thickness of the layers can be controlled relative to each other within the annular channel 40 surrounding the mandrel 42. Increased delivery pressure increases the thickness of the delivered layer and relatively decreases the thickness of the previously extruded layer. Reduced delivery pressure decreases the thickness of the new layer delivered while relatively increasing the thickness of the previously extruded layer.

The annular steps A-F on the mandrel 42 opposite the mouths of the orifices 134 in each module assembly have individual depths sufficient to allow the previously extruded layer or layers on the mandrel (if any) to be moved inwardly against the reduced diameter downstream portion of the mandrel 42 to provide space for the later molten resin flowed through an orifice 134 and into the space between the previously extruded layer (if any) and the surface 116 of the cylindrical bore of channel 40.

Figure 8:
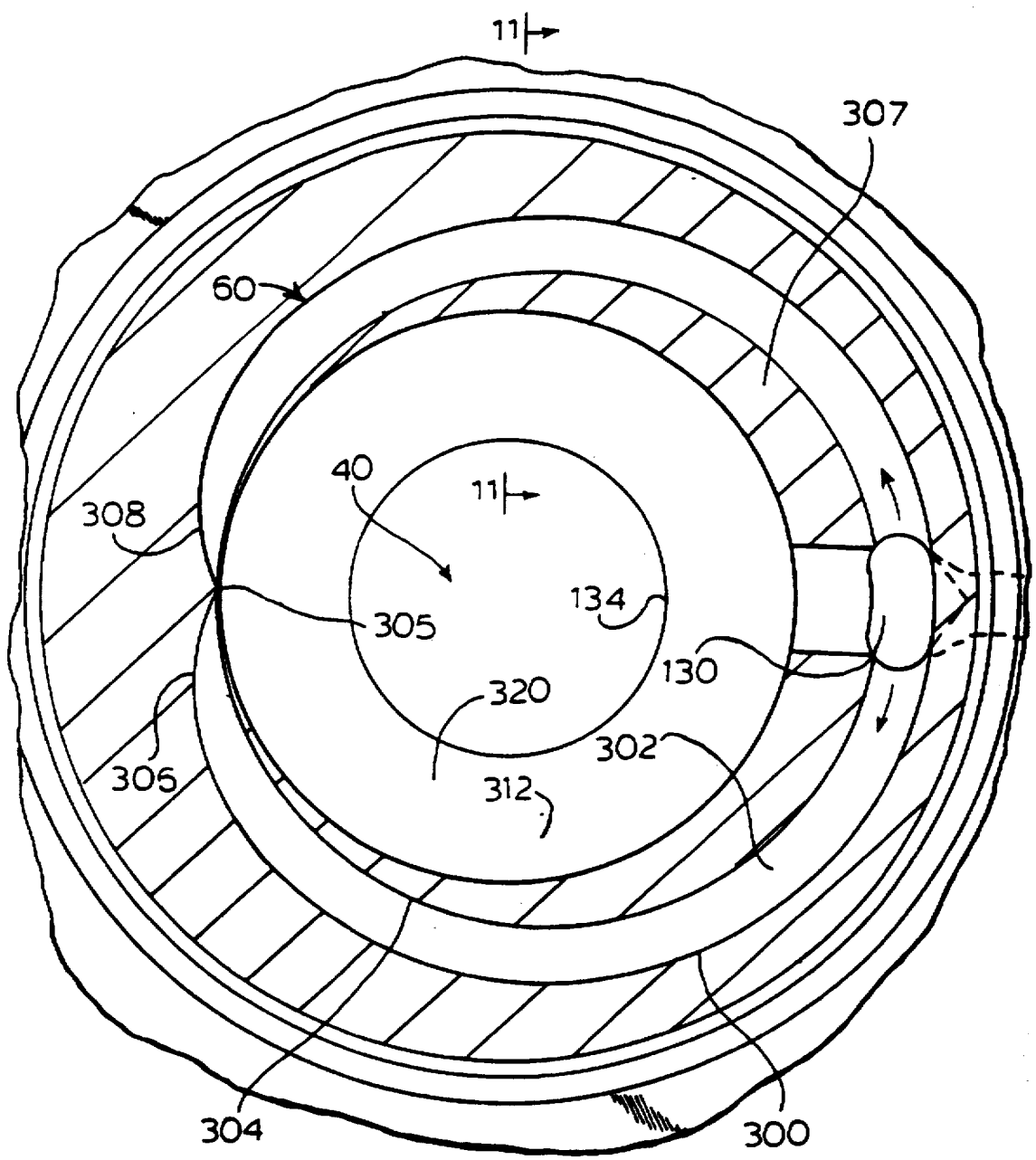
FIG. 8 is a view-from-above of the lower plate seen in FIG. 6.

The length of the steps is selected so that the layers will have the desired relative thickness below the orifice 134 of each module. This compensates for the fact that the thickness of the layers increases as they are moved radially inwardly at the steps and their circumference decreases. As shown in FIG. 8, the steps on the mandrel 42 occur in a smooth curve at the level of each orifice 134 or preferably a distance upstream of the direction of the extrusion, equal to the thickness of the incoming resin layer. The curve is not sharp, preferably a smooth transition between steps to minimize the disturbance of the resin flow as it impinges on the mandrel 42. This structure eliminates the possibility of a stagnant flow zone at the step and assists in the maintenance of the desired constant and uniform flow rate in the apparatus 10.

Figure 10:
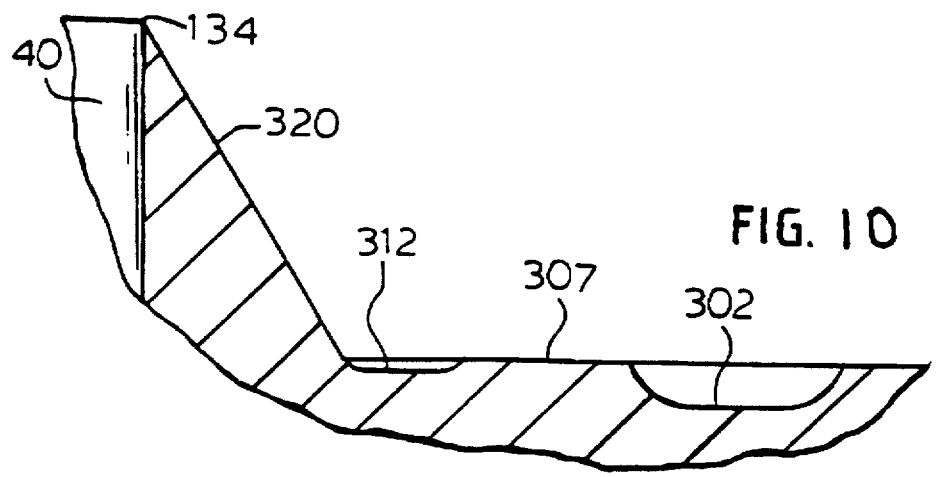
FIG. 10 is a cross-sectional side view along the lines 10—10 of FIG. 8.
Figure 9:
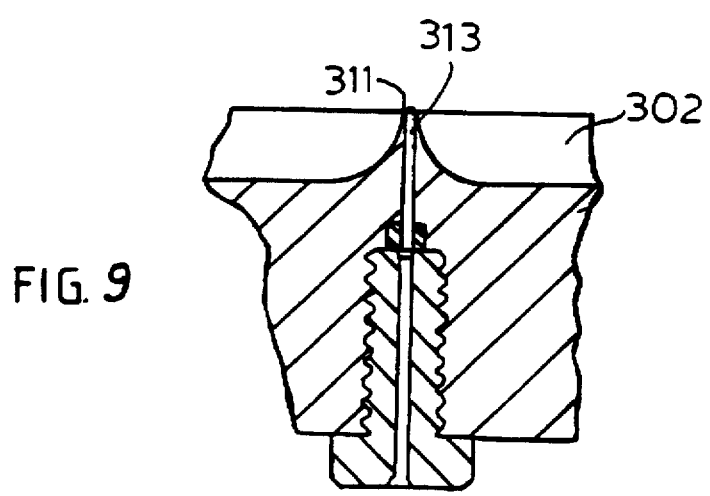
FIG. 9 is an enlarged, side view in cross section of a portion of a lower die plate of FIG. 8.
Figure 7:
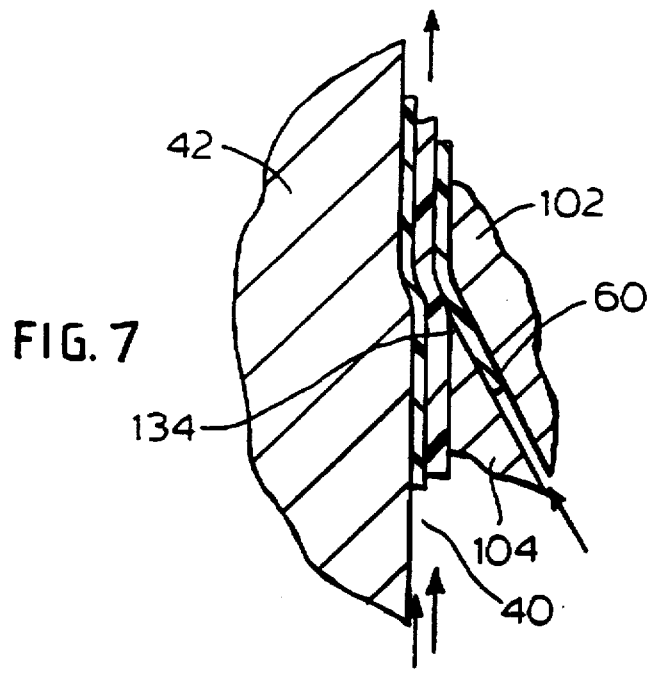
FIG. 7 is a cross-sectional side elevation of a portion of the apparatus of FIG. 1, showing a resin layer flow.

FIG. 8 is a view-from-above of the distribution channel 60 seen in FIGS. 1–7. The resin melt inlet 130 discharges resin melt into the channel 60. Preferably a blade divider mounted on the floor of the channel 60 opposite inlet 130 splits the flow, one-half in each direction. Details are shown in FIG. 10, an enlarged view of the diverter 311 in place. A temperature sensor 313 may be emplaced to sense the temperature of the diverted resin. One-half of the resin will flow from point 130 as indicated by one of the arrows in FIG. 9 and the other half will flow in the general direction of the other arrow. Each half of the resin split will flow ultimately towards the annular orifice 134. The divider may be movably positioned so as to adjust flow whereby more flow is directed in one half than in the other half, to compensate for imbalances in natural flow within the passage. As shown in FIG. 8, the channel 60 comprises four distinct zones within the outer boundary of a closed imaginary line 300 describing an annular, closed line. The outer zone 302 is bounded for the most part on its outer edge by the line 300 and on its inner edge by a line 304 which is a circle of lesser diameter than created by line 300. The outer zone 302 is of substantially uniform dimension as it extends in two directions as indicated by the previously referred to arrows, from the inlet 130 towards point 305. Point 305 is a point located 180° across from the inlet 130, where the drawn arcs 306 and 308 cross. The arcs 306 and 308 each originate at a point on line 300 approximately 150° left and right of inlet 130 and cross on line 304 at point 305. The zone 302 begins to diminish in size along the boundaries of the arcs 306 and 308 and actually terminates, i.e., is diminished to no dimension at point 305. Thus, the outer zone 302 is actually divided in two semi-circular halves originating at inlet 130 and terminating at point 305. Each half does not communicate with the other half of the zone 302 through point 305. In operation, the outer zone 302 is a substantially circular primary resin flow path, eccentric with regard to the extrusion channel 40 central axis with the centerline of the zone 302 located on a radial line extending from the center of the channel 40 toward the line 300 and spaced from the extrusion channel 40.

Molten resin flowing through the inlet 130 fills the primary channel of zone 302 and flows from the zone 302 radially inwardly through a narrow gate section. The direction of flow is toward the extrusion channel 40. The narrow gate section identified on the drawing of FIG. 8 is annular compression zone 307. Adjacent to and on the inner edge of line 304 is the shaped compression zone 307. The zone 307 is termed a "compression" zone because it has substantially less height than the zone 302 or the zone 312 bordering on its inner aspect. The zone 307 is annular in shape defined on its inner edge by an annular zone 312.

The channel area of zone 302 is eccentric to the zone 307 to provide a varying width gate with the maximum width of the gate at the inlet 130. This variation in width restricts flow from the inlet 130 directly through the gate to the zone 312 thereby channeling the resin around the zone 302 channel to fill the zone 302 so that resin flows to the zone 312 ring essentially uniformly around the ring of channel 60. All resin flowing through the inlet 130 moves to the zone 312 at an essentially uniform rate around the circumference of the ring of zones 302 and 308 since the channel restriction of zone 308 modifies the speed of the resin flow across the direct distance between the line 300 and the zone 312 and allows for the further distance the resin must flow about the outer circumference of channel 60.

Radially flowing resin from the zone 308 fills a circumferential equilibration or transition ring which is annular zone 312 surrounding the bottom of the frustrum leading to the orifice 134. The purpose of the annular zone 312 is to allow equilibration of pressure gradients in the resin and to assure uniform parallel volumetric flow of resin down through the frustrum. This aids to obviate knit lines.

The frustrum-channel zone 320 is open to receive resin melt from the annular zone 312 and changes the flow direction upward along the frustrum; see FIG. 5. The frustrum channel zone 320 opens into the orifice 134. The width of this passage zone 320 increases as the diameter decreases moving from the zone 312 to the orifice 134 to provide an essentially constant cross section. In this way, resin flowing through the zone 320 is not restricted. A constant volumetric flow is maintained by compensating for increased pressure in the passage of zone 320 without significant pressure drop. This is essential for avoiding knit lines in the parison to be extruded.

In summary, the resin flow path in apparatus 10 includes a distribution portion located in a plane perpendicular to the mandrel axis and a frustoconical portion extending upwardly from the plane downstream and inwardly toward the orifice 134.

FIG. 10 is a cross-sectional side view along lines 10—10 of FIG. 8 and shows further detail of the distribution channel 60.

The following preparations and examples describe the manner and process of making and using the invention and set forth the best mode contemplated by the inventor of carrying out the invention.

PREPARATION

An additive for blending with a polyethylene resin is prepared by mixing polyvinylidine fluoride (PVDF) and aluminum stearate with HMW-HDPE thermoplastic. The PVDF can be in either powderized or pelletized form. The components of the blend were mixed together in the following ratio:

| | |
|---|---|
| HMW-HDPE | 52 lbs. |
| PVDF | 48 lbs. |
| Aluminum stearate | 56 grms/cwt. |

After mixing of the additive, it is suitable for a subsequent blending with a polyethylene resin. The subsequent blending creates a thermoplastic composite for thermoforming articles such as containers that resist and reduce permeation of hydrocarbon through its walls. It is preferred that after the subsequent mixing with the polyethylene thermoplastic, the additive comprise 3 to 30% of the total resin composition.

TEST DATA

Three drums fabricated from HMW-HDPE (two of them from blends with the additive) were tested to determine the amount of hydrocarbon permeation through the drum walls.

The drums were filled with xylene and then stored for a period of a year. Data reflecting the percentage of fluid permeating through the drum was compiled on an intermittent basis.

Drum #1 was a control drum possessing no permeation resistant additive. Drum #2 possessed a 3% by weight permeation resistant additive of the above Preparation. Drum #3 possessed a 6% by weight permeation resistant additive of the above Preparation.

|  | 30 day/50° C. | 12 weeks/50° C. | 1 year at ambient |
|---|---|---|---|
| Drum #1 | 0.7% loss | 2.08% loss | 6.0% loss |
| 3% Drum #2 | 0.4% loss | 1.1% loss | 4.7% loss |
| 6% Drum #3 | 0.19% loss | 0.58% loss | 4.6% loss |

As can be seen, the drums fabricated from HMW-HDPE containing the additive exhibit a resistance to hydrocarbon permeation. The additive brings the drums into compliance with Department of Transportation regulations, which set a maximum of 0.5% loss at 50° C. for a thirty day period for hazardous materials, and 2% loss at 50° C. for a thirty day period for non-hazardous materials.

EXAMPLE 1

A 5-layered, polymeric resin parison is produced with a 5 module die head as described above and shown in the accompanying drawings of FIGS. 1–10. In the No. 1 module (for lay-down of the base layer upon the mandrel component) there is introduced a melt of a poly-carbonate resin (LEXAN 154, General Electric Co.). In the following 4 modules, in sequence, there is introduced for subsequent lay-down, melts of a polyolefin resin tie layer (E-310K), a random copolymer of ethylene and vinyl alcohol (EVAL-F; Kuraray Co., Ltd., Evol Co. of America, Omaha, Nebr.), a second resin tie layer (Adner VP-600; an adhesive polyolefin (polyvinyl acetate/polyethylene copolymer] Mitsui Petrochemical Industries Ltd., Tokyo, Japan) and HMW-HDPE to which 6% by weight of the Preparation described above is added with blending. The individual modules are heated to a melt temperature for each resin material introduced and maintained at the temperature selected to deliver the resin under predetermined flow rates to the extrusion channel for sequential lay-down, forming the multi-layered parison. The total residence time of the base layer in the extrusion channel is about 1 second. The product parison is uniform in weight throughout the length, bubble free (to the naked eye) and there is no visible knit line. The product is obtained at a rate of 690 lbs/hour. The temperature of each module is given in the Table below with the approximate thickness of the layer extruded.

TABLE

| Module | Resin | Module Temperature (C°.) | Percent of Tube Thickness |
|---|---|---|---|
| 1 | Polycarbonate | 260 | 75 |
| 2 | E-310K | 218 | 5 |
| 3 | EVAL-F | 218 | 5 |
| 4 | VP-600 | 218 | 5 |
| 5 | HMW-HDPE with 6% by weight additive of the Preparation | 215 | 10 |

The parison is cooled, selectively, by first cooling the modules below the temperature of the adjacent portion of the mandrel so that the surface adjacent the mandrel cools more slowly and maintains a temperature above the first order transition temperature for the resin, while the surface adjacent to the module surface cools more rapidly to a temperature below the first order transition temperature for that resin.

The parison obtained can be blow-molded by the method described in U.S. Pat.No. 4,472,343 to obtain container vessels which are shown to be of improved solvent impermeability.

EXAMPLE 2

This example is not an example of the invention, but is made for purposes of comparison.

A conventional screw-type extruder with 4 heat zones and a separate 2 heat-zone accumulator head is charged with HMW-HDPE resin containing 6% by weight of the Preparation, supra. and a monolayer parison is extruded under the following conditions of temperature.

|  | Temperature (°C.) |
|---|---|
| Extruder |  |
| Zone #1 | 171 |
| Zone #2 | 176 |
| Zone #3 | 176 |
| Zone #4 | 182 |
| Adaptor to Head | 176 |
| Accumulator Head |  |
| Zone #1 | 190 |
| Zone #2 | 190 |
| Die Head | 196 |
| Mold Cooling Temperature | 15 |

The parison extruded is blow-molded to obtain a container vessel (90 gal. tank) characterized in part by a rough outer surface described as a "cottage cheese" appearance. This is believed to be due in part to flotation of the PVDF ingredient of the additive blended in the extruded composition, to the inner surface of the blown container. Cooling was effected by rapid cooling of the article to room temperature.

EXAMPLE 3

The extrusion and blow molding of Example 2, supra., was repeated, employing the blend containing 6% of the Preparation, supra., described above, except under the following temperature conditions.

|  | Temperature (°C.) |
|---|---|
| Extruder |  |
| Zone #1 | 213 |
| Zone #2 | 213 |
| Zone #3 | 213 |
| Zone #4 | 216 |
| Adaptor to Head | 213 |
| Accumulator Head |  |
| Zone #1 | 216 |
| Zone #2 | 216 |
| Die Head | 224 |
| Mold Cooling Temperature | 15 |

Cooling was carried out as in Example 2, supra., except that the first (inner) surface of the parison was maintained at a temperature between the first order transition temperature and the second order transition temperature (149° C.) while maintaining the second (outer) surface at a temperature above the first order transition temperature (190° C.) for sufficient time to obtain crystallization of the PVDF at the second surface. In comparison to the vessel of Example 2, supra., the blown container (a 90 gallon tank) exhibits a smooth outer surface finish. Microscopic examination of a section of the container wall shows a highly crystalline layer (PVDF) adjacent to the outer surface of the container.

To test the permeability characteristics of the above articles prepared in Examples 2 and 3, we conducted permeation tests in a circulating oven, at 50° C. comparing the prior art non-treated HMW-HDPE (no additive of the Preparation) with the blends of 6% of the preparation, supra., as additive, using xylene as a hydrocarbon solvent.

The test results using xylene as the contained hydrocarbon are shown in the table below.

TABLE

|  | Percent Loss | |
| --- | --- | --- |
|  | 30 Days | 12 Weeks |
| Example 2 (comparative) | 0.4 | 1.1 |
| Example 3 (invention) | 0.19 | 0.58 |
| Control (no additive) | 0.7 | 2.08 |

EXAMPLE 4

The procedure of Example 3, supra., was repeated. Permeability test results employing heating oil as the stored hydrocarbon solvent in the permeability test are shown in FIG. 11, a graph reporting permeability of the HMW-HDPE control (Example 2) and with 6 percent additive (Example 3) or 20 percent additive (Example 5) and in comparison to a prior art fluorinated surface HMW-HDPE vessel ($F_3$).

EXAMPLE 5

A blend of HMW-HDPE was prepared to include 10 percent by weight of the Preparation, supra. A portion of the blend was extruded and blown to obtain a container vessel "A" following the procedure of Example 2 above (non-invention). another portion was extruded and blown to obtain a container vessel "B" according to the procedure of Example 3, supra. (the invention). For control purposes a third container vessel "C" was fabricated from the base HMW-HDPE resin (without the additive Preparation.). The three container vessels were tested to determine permeability to perchloroethylene.

| Test medium | Perchloroethylene |
| --- | --- |
| Specimen thickness | 0.090" |
| Length of test | twelve (12) days |
| Temperature of test | 72 degrees (f.) |
| Humidity | 50% RH |
| Measurements | Daily, during (12) day period |
| Test Instruments | Lab Controlled Humidity Mitituoyo-CCM Machine |

The percent weight loss of perchloroethylene over the 12 day period was as follows:

| Container | Percent Loss |
| --- | --- |
| Container vessel A (invention) | <0.02 |
| Container vessel B (invention) | <0.02 |
| Container vessel C (control) | <0.28 |
| Container Vessel D (control) | <0.28 |

The effect of the invention upon mechanical properties of the test vessels could also be determined by sample disc cupping evaluations. In this evaluation, discs of the extruded resin are used to close the mouth of a Mason type jar, containing about ½ fill of perchloroethylene. Allowed to stand for 12 days, the discs absorb perchloroethylene vapors at room temperature. The weight of the disc responds to gravity as the disc degrades from permeation with the solvent vapors, forming a "cup". The depth of the cup is an indication of the degree of loss in mechanical properties. The test results are as shown below.

|  | Inches Cupped |
| --- | --- |
| Resin of vessel A (invention) | 0.079 |
| Resin of vessel B (invention) | 0.019 |
| Resin of vessel C (control) | 0.27 |
| Resin of Vessel D (control) | 0.26 |

Crystallinity improvement, through processing, will dramatically effect the retardation of permeation and reduce loss of mechanical properties due to hydrocarbon solvent exposure.

What is claimed is:

1. A process for preparing polyethylene resin containing articles of reduced hydrocarbon permeability, which comprises;

providing a thermoplastic resin composition, which comprises;

a major proportion of a polyethylene resin;

a minor proportion of polyvinylidene fluoride: and a binding proportion of aluminum stearate;

feeding the resin composition to a heating zone, said zone being maintained at a temperature above the first order phase transition temperature of the polyethylene, whereby said fed composition is thermally plasticized;

continuously passing the plasticized composition to a shaping zone wherein said plasticized composition is shaped in the form of an article having first and second surfaces;

cooling the article first surface to a temperature between the first and the second order phase transition temperatures of the polyethylene, while maintaining the second surface at a temperature above the first order phase transition temperature for a period of time sufficient to form sperulites of crystals adjacent the first surface and then cooling the whole of the article to room temperture.

2. The process of claim 1 wherein the polyethylene resin is a high molecular weight-high density polyethylene resin.

3. The process of claim 1 wherein the heating zone comprises a heating zone in a thermoplastic extruder for extrusion and the shaping zone is the extruder die.

4. The process of claim 3 wherein the extruder die extrudes a monolayer extrudate.

5. The process of claim 3 wherein the extruder die extrudes a multi-layer extrudate.

6. The process of claim 5 wherein the polyethylene resin is extruded as one layer of the multi-layered extrudate.

7. Articles prepared by the process of claim 1.

8. Articles of claim 7 which are containers.

9. The process of claim 1 which further comprises blowing the article to form a container.

* * * * *